(12) United States Patent
Okihira et al.

(10) Patent No.: US 9,029,796 B2
(45) Date of Patent: May 12, 2015

(54) DRIFT TUBE MANUFACTURING METHOD AND DRIFT TUBE

(71) Applicant: Mitsubishi Heavy Industries, Ltd., Tokyo (JP)

(72) Inventors: Kazunori Okihira, Tokyo (JP); Kyusaku Higa, Tokyo (JP); Fumiaki Inoue, Tokyo (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 0 days.

(21) Appl. No.: 14/047,258

(22) Filed: Oct. 7, 2013

(65) Prior Publication Data

US 2014/0132374 A1 May 15, 2014

(30) Foreign Application Priority Data

Nov. 14, 2012 (JP) ................................. 2012-250330

(51) Int. Cl.
| | | |
|---|---|---|
| G21K 5/04 | (2006.01) | |
| H05H 7/22 | (2006.01) | |
| B23K 26/32 | (2014.01) | |
| H05H 9/04 | (2006.01) | |

(52) U.S. Cl.
CPC .............. *H05H 7/22* (2013.01); *B23K 26/3213* (2013.01); *H05H 9/042* (2013.01); *H05H 2007/222* (2013.01)

(58) Field of Classification Search
USPC ....... 250/396 R, 397, 398, 396 ML; 315/500, 315/501, 502, 503, 504, 505, 506, 507, 508
See application file for complete search history.

(56) References Cited

U.S. PATENT DOCUMENTS

| | | | | |
|---|---|---|---|---|
| 4,658,109 A | * | 4/1987 | Honeycutt et al. | ........ 219/121.63 |
| 6,404,089 B1 | * | 6/2002 | Tomion | .......................... 310/162 |

FOREIGN PATENT DOCUMENTS

| | | |
|---|---|---|
| JP | 3-289097 | 12/1991 |
| JP | 4-289698 | 10/1992 |
| JP | 11-329795 | 11/1999 |
| JP | 2007-174803 | 7/2007 |
| JP | 2007-287538 | 11/2007 |
| JP | 2009-65746 | 3/2009 |
| WO | 2011/154563 | 12/2011 |

OTHER PUBLICATIONS

Extended European Search Report issued Feb. 6, 2014 in European patent application No. 13 18 8266.

(Continued)

*Primary Examiner* — Nicole Ippolito
(74) *Attorney, Agent, or Firm* — Wenderoth, Lind & Ponack, L.L.P.

(57) ABSTRACT

A drift tube manufacturing method and a drift tube which can reduce cost while securing an adequate level of particle beam focusing performance. The method includes: a magnet housing stage of housing a predetermined number of permanent magnets in a housing, which has a through-hole at a center part and an annular magnet housing space on an outer circumferential side of the through-hole; a welding stage of setting a lid for covering the opening part on the opening part; and welding the lid and the housing by laser beam welding. At least a surface of the housing and a surface of the lid are formed of copper.

3 Claims, 5 Drawing Sheets

(56) References Cited

OTHER PUBLICATIONS

D.A.Kashinsky: "First Section of a 352 MHz Prototype Alvarez DTL Tank for the CERN SPL", Proceedings of EPAC06, 2006, pp. 1621-1624.

Hansborough et al: "Mechanical Technologies for the PIGMI", Proceedings of 1979 PAC, vol. 26, No. 3, Jun. 1979, pp. 3770-3772.

E.O.Ballard et al: "Ground test accelerator (GTA) Drift Tube Linac (DTL) fabrication and assembly status", Proceedings of LINAC92, vol. 1, 1992.

M.Vretenar et al: "Design and Development of RF Structures for Linac4", Proceedings of LINAC06, 2006, pp. 679-681.

Office Action issued Aug. 26, 2014 in corresponding Japanese patent application No. 2012-250330 (with English translation).

Decision to Grant a Patent issued Mar. 3, 2015 in corresponding Japanese patent application No. 2012-250330.

\* cited by examiner

DRIFT TUBE MANUFACTURING METHOD AND DRIFT TUBE

CROSS-REFERENCE TO RELATED APPLICATIONS

This application is based on Japanese Patent Application No. 2012-250330, the contents of which are incorporated herein by reference.

BACKGROUND OF THE INVENTION

1. Technical Field

The present invention relates to a manufacturing method of a drift tube which is used for a drift-tube-type accelerator, and to the drift tube.

2. Description of the Related Art

A drift-tube-type accelerator is provided with, inside a cylindrical tube, a plurality of drift tubes disposed at intervals on and along the central axis of the tube (e.g., see Japanese Unexamined Utility Model Application, Publication No. Hei 4-108900). Each drift tube has an annular shape with a through-hole formed at the center part, and magnets for generating magnetic fields are embedded on the outer circumferential side of the through-hole. This drift tube is suspended by a rod-like stem from the upper side of the tube so that the through-hole is positioned on the central axis of the tube.

In such an accelerator, a particle beam such as a proton beam and an ion beam generated by a beam generator is accelerated inside the tube and fired at a target to thereby carry out experiments and the like. At this time, since otherwise the particle beam is diffused inside the tube, the particle beam is directed through the through-hole of the drift tube so that the particle beam is focused by the magnetic fields generated by the magnets.

SUMMARY OF THE INVENTION

1. Technical Problem

Since a permanent magnet is used as the magnet in a technology described in JP 4-108900, there are the following problems.

First, during manufacturing of the drift tube, the permanent magnet is housed in a housing of the drift tube from an opening part formed in the housing, the opening part of the housing is covered by a lid, and the lid and the housing are welded together. There is a problem when electron beam welding is used for the welding. That is, since electron beam welding is performed under vacuum, heat cannot be released and thermal effect increases, leading to demagnetization of the permanent magnet. Further, when the housing is formed of a material having low thermal conductivity, such as stainless alloy, the cooling efficiency is poor relative to an amount of heat which is generated on a surface of the drift tube by the particle beam during operation of the accelerator. Then, there is a problem that temperature rise becomes larger, causing thermal strain of the housing or the lid and demagnetization of the permanent magnet.

In a case of the permanent magnet, if electron beam welding is used for the welding, the electron beam is bent under the influence of a magnetic field generated by the permanent magnet. This causes another problem that welding cannot be accurately performed along the boundary between the lid and the housing.

On the other hand, since the above problem can be solved by using an electromagnet instead of the permanent magnet as the magnet of the drift tube, a drift tube using the electromagnet has been adopted in recent years (e.g., see Japanese Unexamined Patent Application, Publication No. Hei 11-329795).

When the electromagnet is used, a current is applied to a coil provided inside the drift tube in order to generate a magnetic field. Thus, wiring and insulation of each part are required, etc., and an inner structure of a cell becomes complicated. An external power supply, etc. for supplying a current to the coil is also required. This causes still another problem that the cost of the device increases.

The present invention has been made in view of the above situation, and an object thereof is to provide a drift tube manufacturing method and a drift tube which can reduce the cost while securing an adequate level of particle beam focusing performance.

2. Solution of the Problem

According to a first aspect of the present invention, there is provided a manufacturing method of a drift tube installed in a drift-tube-type accelerator, including: a magnet housing stage of housing a predetermined number of permanent magnets in a housing, which has a through-hole at a center part and an annular magnet housing space on an outer circumferential side of the through-hole, from an opening part of the magnet housing space into the magnet housing space; and a welding stage of setting a lid for covering the opening part on the opening part, and welding the lid and the housing by laser beam welding, in which at least a surface of the housing and a surface of the lid are formed of copper.

A large number of the drift tubes as described above are arrayed, inside a cylindrical tube constituting the accelerator, along the central axis of the tube. By using the permanent magnet as the magnet which generates magnetic fields for focusing the particle beam, the structure of the drift tube can be made simpler compared to a case where the electromagnet is used as the magnet.

In contrast to electron beam welding which is performed under vacuum, since laser beam welding can be performed in the atmosphere, heat generated during welding is dissipated into the surrounding atmosphere. Therefore, the permanent magnet is little affected by heat from welding, and performance degradation of the permanent magnet can be prevented. Further, by forming the housing and the lid with copper which has high thermal conductivity, efficiency during cooling is higher and the temperature is less likely to increase compared to a case where the housing and the lid are formed of stainless alloy which has low thermal conductivity. Thus, since the temperature rise becomes smaller relative to the amount of heat which is generated on the housing by the particle beam during operation of the accelerator, thermal strain of the housing or the lid and performance degradation of the permanent magnet can be suppressed.

Here, regarding the housing and the lid, it is only necessary that at least the surface of the housing and the surface of the lid (more specifically, e.g., at least a surface of a portion to be welded between the housing and the lid) are formed of copper. For example, the housing and the lid themselves may be formed of stainless alloy, or the like, and the entire surfaces may be formed of copper using a method such as electroforming. Alternatively, the housing and the lid themselves may be formed of copper.

The housing has an opening part at one end side of the through-hole, and in the welding stage, at least an inner circumferential portion of the lid and a portion around the through-hole of the housing may be welded by laser beam welding.

That is, only the portion around the through-hole at the center part of the housing is welded by laser beam welding, and other portions, namely, a welding portion between the outer circumferential portion of the lid and the portion of the housing on the outer circumferential side of the opening part may be welded by another welding method such as electron beam welding. Since the magnetic fields of the magnets are concentrated in the center part of the housing, adverse effect of using electron beam welding is large. Therefore, using laser beam welding here is especially advantageous, although in terms of work efficiency, it is preferable to weld the lid and the housing by laser beam welding only.

In the magnet housing stage, the predetermined number of permanent magnets may be housed in a magnet case, and the magnet case may be housed in the magnet housing space.

This allows the permanent magnets to be set in the magnet housing space with high accuracy. Accordingly, a center of a magnetic field, etc. of the permanent magnet can be positioned with high accuracy. In addition, assembly of the drift tube becomes easier.

According to a second aspect of the present invention, there is provided a drift tube installed in a drift-tube-type accelerator, including: a housing which has a through-hole at a center part and is formed with an annular magnet housing space, which has an opening part on one end side of the through-hole, on an outer circumferential side of the through-hole; a predetermined number of permanent magnets housed in the magnet housing space; and a lid which covers the opening part and is welded to the housing, in which at least a surface of the housing and a surface of the lid are formed of copper.

Such a drift tube can be formed by the drift tube manufacturing method described above.

3. Advantageous Effects of the Invention

According to the present invention, it is possible to reduce the cost while securing an adequate level of particle beam focusing performance.

DETAILED DESCRIPTION OF THE INVENTION

Hereinbelow, one embodiment of a drift tube manufacturing method and a drift tube according to the present invention will be described with reference to the drawings.

Figure 1:
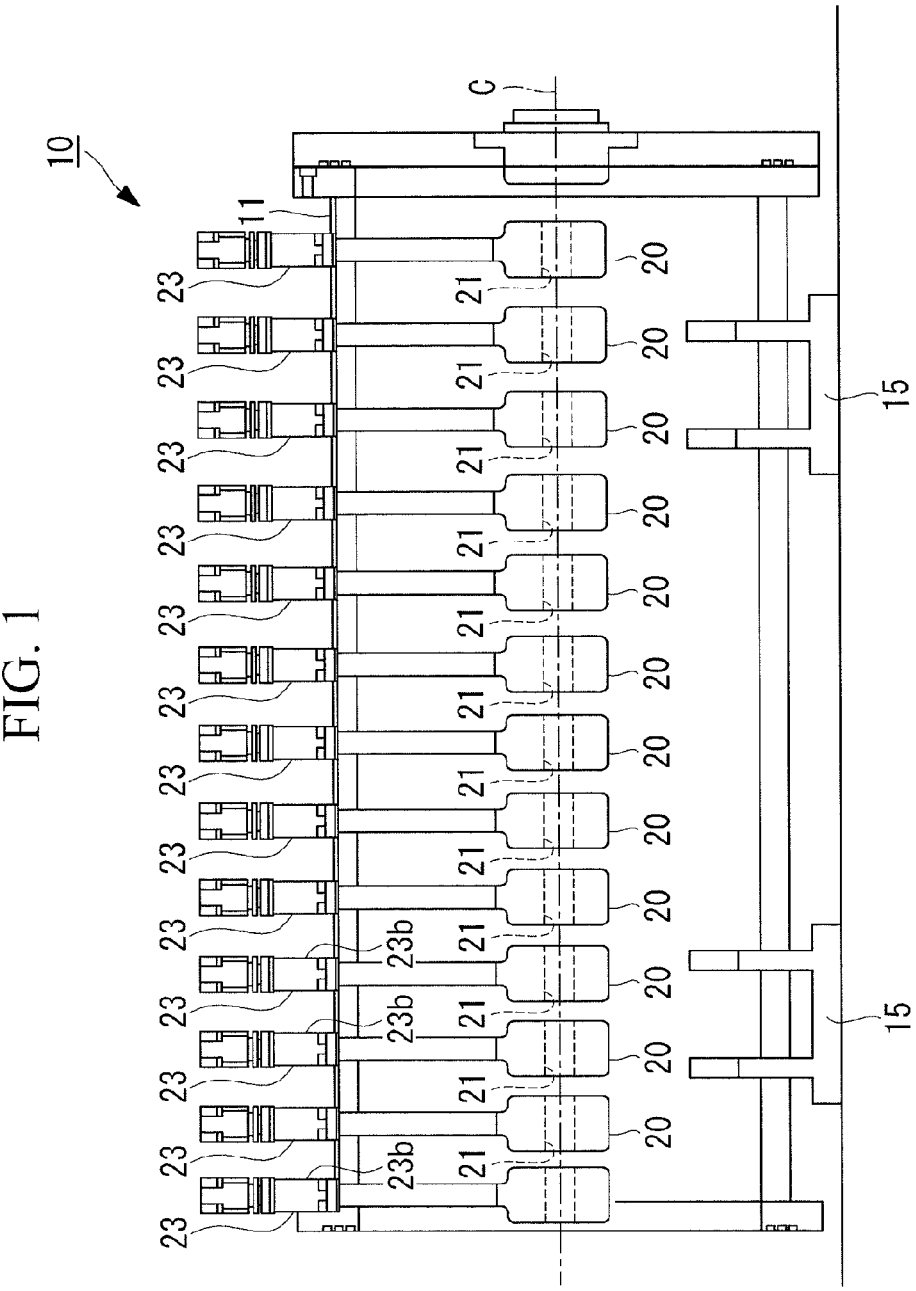
FIG. 1 is a sectional side view showing a partial configuration of an accelerator equipped with drift tubes of the present invention.

As shown in FIG. 1, a drift-tube-type accelerator 10 is provided with, inside a cylindrical tube 11, a plurality of drift tubes 20 disposed at intervals on and along a central axis C of the tube 11.

The tube 11 is installed on the floor through legs 15.

Figure 2:
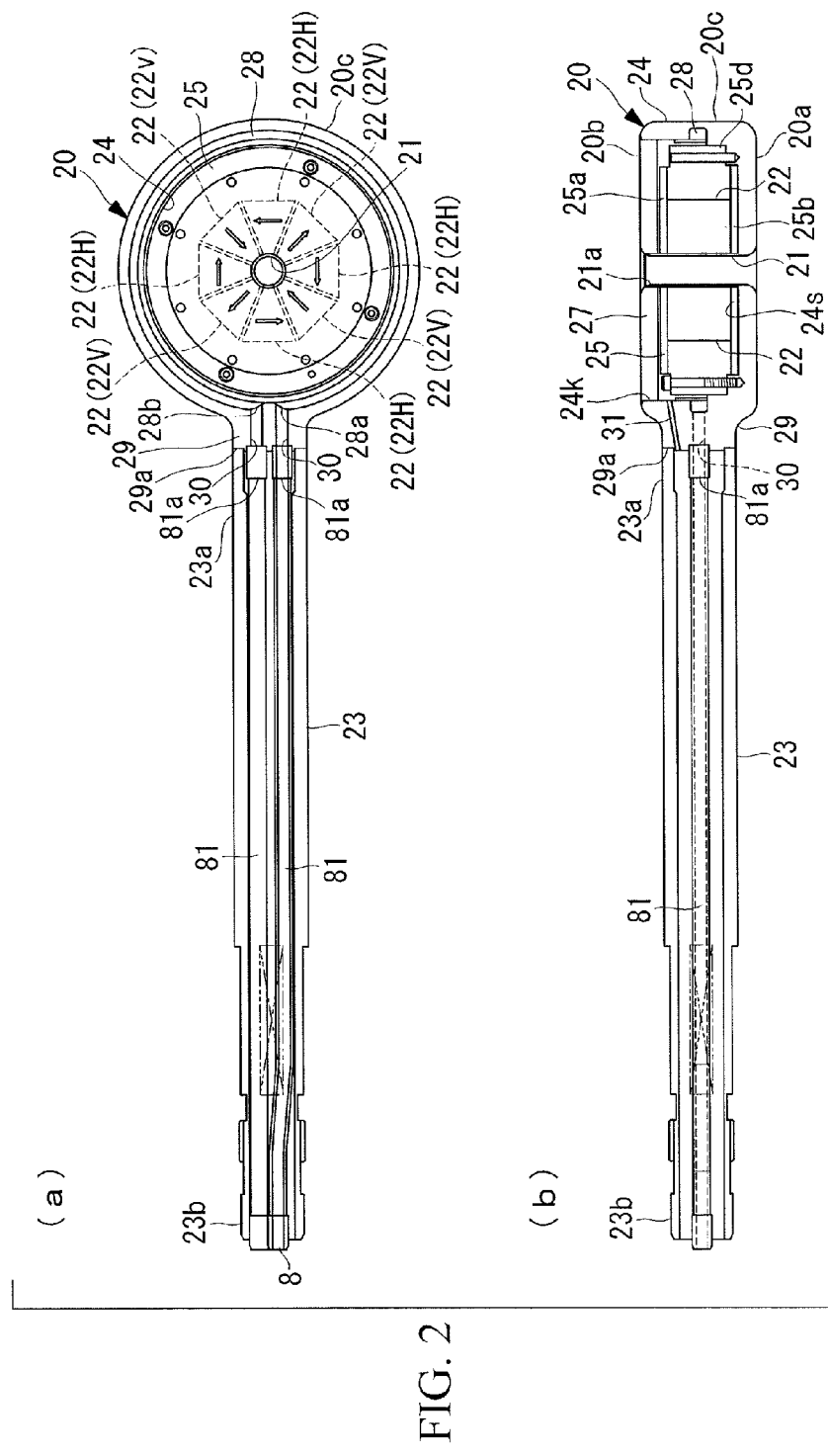
FIGS. 2 (a) and (b) are a front view and a sectional side view, respectively, showing the drift tube of the present invention.

As shown in FIG. 2, an outline of each drift tube 20 has an annular shape including: disc-shaped end surface parts 20a and 20b formed parallel to each other with a clearance therebetween; a substantially cylindrical outer circumferential surface part 20c formed between outer circumferential portions of the end surface parts 20a and 20b; and a through-hole 21 communicating between center parts of the end surface parts 20a and 20b.

As shown in FIG. 1, this drift tube 20 is suspended by a rod-like stem 23 from an upper side of the tube 11 so that the center of the through-hole 21 is positioned on the central axis C of the tube 11.

Figure 3:
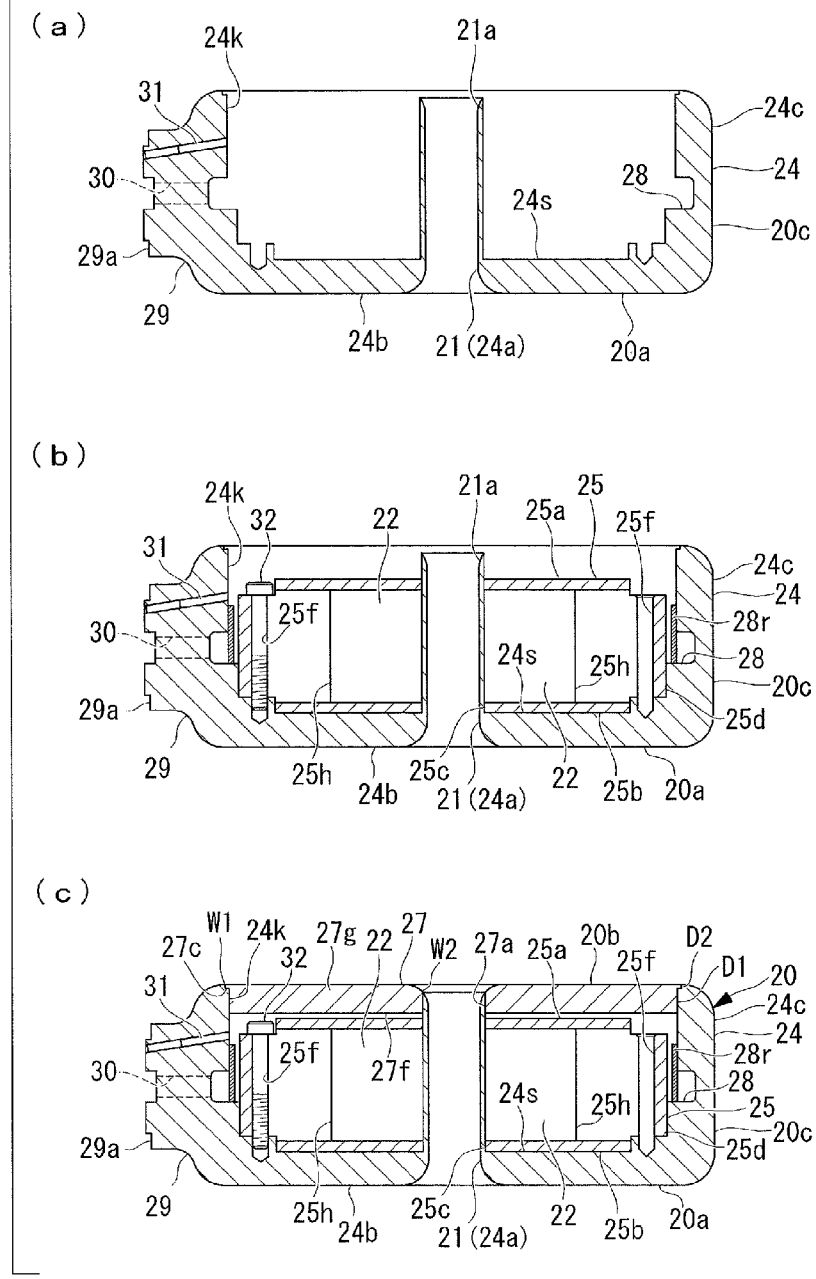
FIGS. 3 (a), (b), and (c) are views showing a flow of a drift tube manufacturing method of the present invention.

As shown in FIGS. 2 and 3 (c), the drift tube 20 is provided with: a housing 24 having a magnet housing space 24s; a magnet case 25 housed in the magnet housing space 24s; magnets (permanent magnets) 22 which are held by the magnet case 25 on the outer circumferential side of the through-hole 21 and generate a magnetic field; and a lid 27 which forms the end surface part 20b and covers the opening part 24k of the magnet housing space 24s.

As shown in FIG. 3 (a), the housing 24 is formed to include: a cylindrical wall part 24a forming the through-hole 21; a disc part 24b extending from one end of the cylindrical wall part 24a toward the outer circumferential side and forming the end surface part 20a; and an outer circumferential wall part 24c extending from an outer circumferential portion of the disc part 24b, perpendicularly to a surface of the disc part 24b, in the same direction as the cylindrical wall part 24a. Thus, in the housing 24, the through-hole 21 is formed at the center part, and the annular magnet housing space 24s is formed, on the outer circumferential side of the through-hole 21, surrounded by the cylindrical wall part 24a, the disc part 24b, and the outer circumferential wall part 24c. The opening part 24k of this magnet housing space 24s is opened at the through-hole 21 toward an end portion (one end) 21a side which is opposite to the side where the cylindrical wall part 24a is formed.

Of this housing 24, the disc part 24b and the outer circumferential wall part 24c are preferably made of copper, but the cylindrical wall part 24a may be made of stainless alloy. Further, the housing 24 itself may be made of stainless alloy, and a film of copper may be formed on the surface by electroforming.

A C-shaped groove 28 which continues in a circumferential direction and has a portion in the circumferential direction cut off is formed in an inner circumferential surface of the outer circumferential wall part 24c of the housing 24. An opening of the groove 28 on the inner circumferential side is blocked by a ring-shaped member 28r.

A stem connection part 29 for connecting the stem 23 is formed on the outer circumferential surface side of the outer circumferential wall part 24c so as to protrude toward the outer circumference. This stem connection part 29 includes a connection surface 29a to which the stem 23 is connected.

As shown in FIG. 2 (a), two communication holes 30 which communicate between the connection surface 29a and the groove 28 are formed in the stem connection part 29, and one of the communication holes 30 communicates with one end 28a of the C-shaped groove 28, and the other communication hole 30 communicates with the other end 28b of the C-shaped groove 28.

Further, as shown in FIG. 3, the stem connection part 29 is formed with the connection surface 29a and an air vent port 31 which communicates with an inner surface of the outer circumferential wall part 24c (magnet housing space 24s).

As shown in FIGS. 3 (b) and 4, the magnet case 25 forms an annular shape which fits into the magnet housing space 24s, and includes: disc parts 25a and 25b formed parallel to each other; a through-hole part 25c formed on the inner circumferential side; and a cylindrical outer circumferential wall part 25d formed on the outer circumferential side.

The through-hole part 25c is a through-hole formed at the center parts of the disc parts 25a and 25b. The through-hole part 25c may be formed by additionally providing a cylindrical body at the center parts of the disc parts 25a and 25b.

Figure 4:
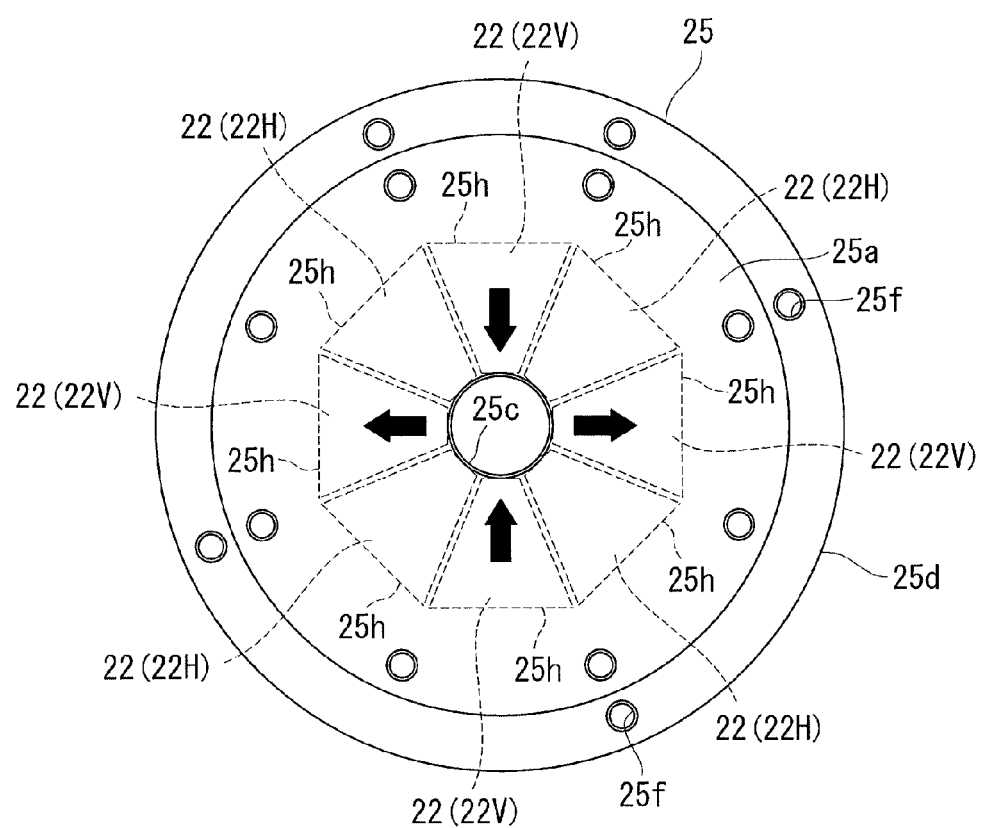
FIG. 4 is a view showing a magnet case installed in the drift tube of the present invention.
Figure 5:
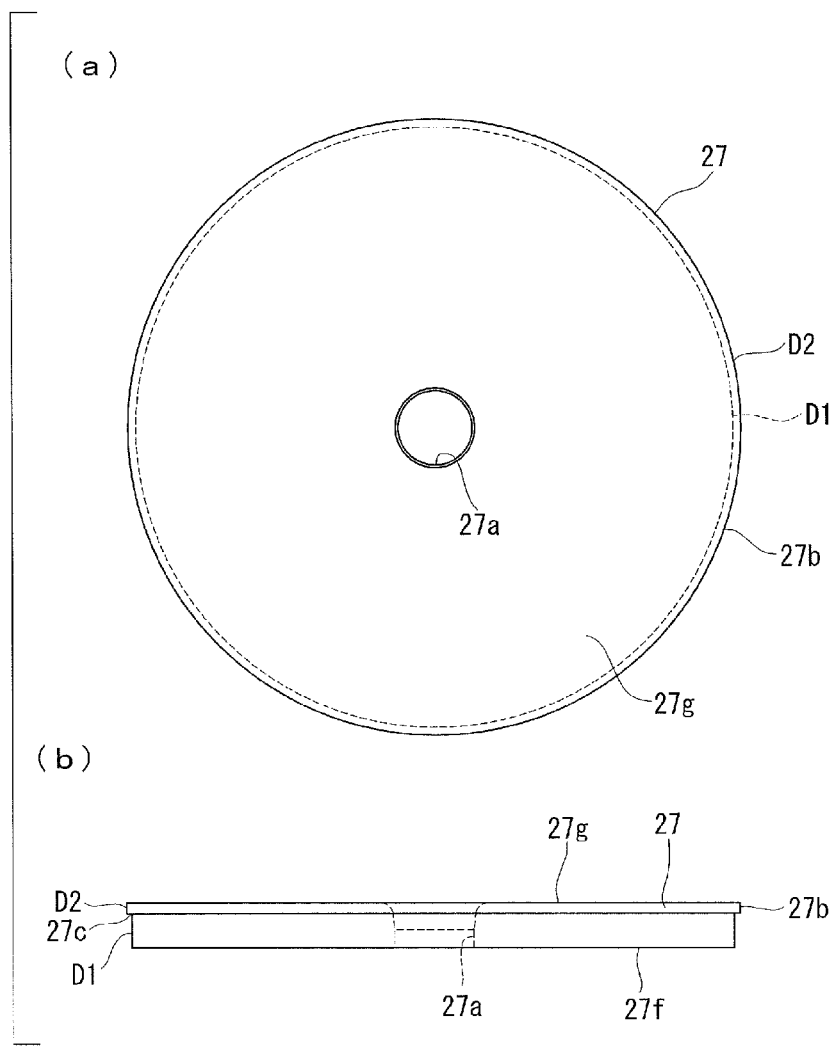
FIGS. 5 (a) and (b) are a front view and a sectional side view, respectively, showing a lid installed in the drift tube of the present invention.

In the magnet case 25, magnet holding parts 25h which hold the plurality of (e.g., eight in the example shown in FIG. 4) magnets 22 are formed on the outer circumferential side of the through-hole part 25c at the center part. Each of the magnet holding parts 25h has a substantially trapezoidal shape in cross-section perpendicular to the axis of the through-hole part 25c, and is radially disposed with its short side directed toward the through-hole part 25c and its long side directed toward the outer circumferential side.

This magnet case 25 can be formed with, for example, stainless alloy.

The magnets 22 are constituted by permanent magnets. Each of the magnets has a substantially trapezoidal cross section so as to fit in the magnet holding part 25h, and has a thickness corresponding to the clearance between the disc parts 25a and 25b.

The magnets 22 are arranged in the circumferential direction around the through-hole part 25c, with a magnet (permanent magnet) 22V for generating a longitudinal magnetic field and a magnet (permanent magnet) 22H for generating a transverse magnetic field disposed alternately.

The magnets 22 and the magnet case 25 are integrally assembled into a unit beforehand.

Then, as shown in FIGS. 3 (a) and (b), the magnet case 25 in which the magnets 22 are embedded is housed in the magnet housing space 24s from the opening side of the housing 24. A fixing hole 25f is formed in the outer circumferential portion of the magnet case 25, and the magnet case 25 is fixed to the housing 24 by inserting a fixing bolt 32 into this fixing hole 25f and screwing the fixing bolt into the disc part 24b of the housing 24.

As shown in FIGS. 3 (c) and 5, the lid 27 has a disc shape and is provided so as to cover the opening part 24k of the magnet housing space 24s of the housing 24, and an opening part 27a, into which a leading end of the cylindrical wall part 24a of the housing 24 fits, is formed at the center part. A step part 27c is formed on the outer circumferential portion 27b of the lid 27 so that, relative to an outer diameter on one surface side 27f of the lid 27, an outer diameter on the other surface side 27g becomes larger. A small diameter portion D1 which is smaller than an inner diameter of the magnet housing space 24s is formed on the one surface side 27f with respect to the step part 27c, and a large diameter portion D2 which is larger than the inner diameter of the magnet housing space 24s is formed on the other surface side 27g with respect to the step part 27c.

As shown in FIG. 3 (c), the lid 27 is mounted on the housing 24 so as to cover the opening part 24k of the magnet housing space 24s. Then, the opening part 27a fits to the cylindrical wall part 24a, and of the outer circumferential portion 27b, the small diameter portion D1 is inserted into the outer circumferential wall part 24c while the large diameter portion D2 butts against the leading end portion of the outer circumferential wall part 24c, thereby covering the opening part 24k of the magnet housing space 24s.

Such a lid 27 is preferably made of copper.

In the lid 27, a butting portion W1 between the large diameter portion D2 and the outer circumferential wall part 24c of the housing 24, and a butting portion W2 between the opening part 27a of the lid 27 and the leading end portion of the cylindrical wall part 24a of the housing 24 on the inside of the opening part are welded continuously in the circumferential direction. Here, laser beam welding is used for welding the butting portions W1 and W2 between the lid 27 and the housing 24 on the inner circumferential side and the outer circumferential side, respectively.

As shown in FIG. 2, the stem 23 for fixing the drift tube 20 to the tube 11 has a cylindrical shape and is provided, inside thereof, with two pipes 81 having leading end portions 81a respectively connected to the two communication holes 30 at the connection surface 29a. An external cooling water supply pump (not shown) is connected to one of the two pipes 81, and a tank, or the like (not shown), for recovering cooling water is connected to the other pipe 81. Thus, the cooling water is circulated through the groove 28 so as to cool the drift tube 20.

Instead of the two pipes 81, one double pipe may be used such that, for example, the external cooling water supply pump (not shown) is connected to a pipe line on an inner side (center side) and the tank, or the like (not shown), for recovering the cooling water is connected to a pipe line on an outer side (outer circumferential side).

The air vent port 31 having one end thereof facing the connection surface 29a communicates with an inner space of the stem 23 and releases heat from the magnet housing space 24s during welding.

One end 23a side of this stem 23 is butted against the stem connection part 29 and welded by electron beam welding on the outer circumferential surface. As shown in FIG. 1, the other end 23b of the stem 23 penetrates the upper side of the tube 11 and is fixed so as to protrude toward the outer circumferential side of the tube 11, and the pipes 81 and the like are connected to the cooling water supply pump, the tank, or the like, outside the tube 11.

In the accelerator 10 equipped with such a drift tube 20, a particle beam such as a proton beam and an ion beam generated by a beam generator (not shown) is accelerated in the tube 11 and fired at a target (not shown) to thereby carry out experiments and the like. At this time, since otherwise the particle beam is diffused in the tube 11, the particle beam is directed through the through-hole 21 of the drift tube 20 so that the particle beam is focused by the magnetic fields generated by the magnets 22.

To assemble this drift tube 20, the predetermined number of magnets 22 are housed in the magnet case 25 beforehand.

Then, the magnet case 25 is housed in and fixed to the magnet housing space 24s from the opening side of the housing 24, and thereafter the lid 27 is set on the housing 24 so as to cover the opening part 24k of the magnet housing space 24s.

In this state, the butting portion W1 between the large diameter portion D2 of the lid 27 and the outer circumferential wall part 24c of the housing 24, and the butting portion W2 between the opening part 27a of the lid 27 and the leading end portion of the cylindrical wall part 24a of the housing 24 on the inside of the opening part are welded by laser beam welding continuously in the circumferential direction. Thereby, the drift tube 20 is formed.

Thereafter, the one end 23a of the stem 23 is butted against the stem connection part 29 of the drift tube 20 and these are welded together by electron beam welding.

According to the above-described configuration, by using the permanent magnet instead of the electromagnet as the magnet 22 of the drift tube 20, the need for an external power supply, and wiring, an insulating member, and the like, inside the drift tube 20 is eliminated, and thereby it is possible to simplify the structure and reduce the cost.

Here, the housing 24 for housing the magnets 22 and the lid 27 are formed of copper. Compared to a case where the housing 24 and the lid 27 are formed of stainless alloy, since copper has high thermal conductivity, the cooling efficiency is higher and the temperature is less likely to increase. Therefore, since the temperature rise becomes smaller relative to the amount of heat which is generated on the surface of the housing 24 by the particle beam during operation of the accelerator 10, demagnetization of the magnets 22 as well as thermal strain can be suppressed.

Moreover, in a case where electron beam welding is used for welding the housing 24 and the lid 27, since electron beam welding is performed under vacuum, heat cannot be released and the effect of the temperature rise due to welding increases. In the present embodiment, however, laser beam welding is used for welding the housing 24 and the lid 27. Since laser beam welding can be performed in the atmosphere, it is excellent in heat dissipation and the thermal effect can be more reliably suppressed.

In addition, in electron beam welding, due to a magnetic force of the magnets 22 constituted by the permanent magnets, the electron beam is bent and weld beads are not formed along the shape of the lid 27, which can degrade the welding quality. In the present embodiment, however, since laser beam welding is used for welding the housing 24 and the lid 27, welding can be performed with good quality and without any influence of the magnets 22.

Thus, in the drift tube 20, it is possible to reduce the cost while securing an adequate level of particle beam focusing performance.

Moreover, the magnets 22 and the magnet case 25 are integrally assembled into a unit beforehand. Since this allows the magnets 22 to be set with accuracy, the stable, high performance of the drift tube 20 can be realized. Further, the assembly becomes easy, which contributes to cost reduction of the drift tube 20.

In the above-described embodiment, any other configuration may be adopted for configurations of those other than the drift tube 20, such as the stem 23 or the entire accelerator 10, without departing from the scope of the present invention.

REFERENCE SIGNS LIST 10 accelerator
11 tube
20 drift tube
20a, 20b end surface part
20c outer circumferential surface part
21 through-hole
21a end part (one end)
22, 22H, 22V magnet (permanent magnet)
23 stem
23a one end
23b other end
24 housing
24a cylindrical wall part
24b disc part
24c outer circumferential wall part
24k opening part
24s magnet housing space
25 magnet case
25a, 25b disc part
25c through-hole part
25d outer circumferential wall part
25h magnet holding part
25f fixing hole
27 lid
27a opening part
27b outer circumferential portion
27c step part
27f one surface side
27g other surface side
28 groove
28a one end
28b other end
29 stem connection part
29a connection surface
30 communication hole
31 air vent port
32 fixing bolt
81 pipe
81a leading end portion
D1 small diameter portion
D2 large diameter portion

The invention claimed is:

1. A manufacturing method of a drift tube installed in a drift-tube-type accelerator, the method comprising:
a stage of housing a predetermined number of permanent magnets in a magnet case;
a magnet housing stage of fitting the magnet case with the predetermined number of permanent magnets in a housing,
the housing having a through-hole at a center part and an annular magnet housing space on an outer circumferential side of the through-hole,
wherein the magnet case is fitting in the housing from an opening part of the annular magnet housing space into the magnet housing space; and
a welding stage of setting a lid for covering the opening part on the opening part, and welding the lid and the housing by laser beam welding,
wherein at least a surface of the housing and a surface of the lid are formed of copper.

2. The manufacturing method of a drift tube according to claim 1, wherein
the housing includes the opening part at one end side of the through-hole, and
in the welding stage, at least an inner circumferential portion of the lid and a portion around the through-hole of the housing are welded by laser beam welding.

3. A drift tube installed in a drift-tube-type accelerator, the drift tube comprising:
a housing which has a through-hole at a center part, the housing being formed with an annular magnet housing space that has an opening part on one end side of the through-hole, the annular magnet housing space being located on an outer circumferential side of the through-hole;
a magnet case disposed in the annular magnet housing space;
a predetermined number of permanent magnets housed in the magnet case; and
a lid covering the opening part and welded to the housing, wherein at least a surface of the housing and a surface of the lid are formed of copper, and the magnet case is fitted from the opening part into the magnet housing space.

\* \* \* \* \*